(12) United States Patent
Fripp et al.

(10) Patent No.: US 9,482,072 B2
(45) Date of Patent: Nov. 1, 2016

(54) SELECTIVE ELECTRICAL ACTIVATION OF DOWNHOLE TOOLS

(71) Applicant: HALLIBURTON ENERGY SERVICES, INC., Houston, TX (US)

(72) Inventors: Michael L. Fripp, Carrollton, TX (US); Zachary W. Walton, Coppell, TX (US); Zachary R. Murphree, Dallas, TX (US); Donald G. Kyle, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 621 days.

(21) Appl. No.: 13/948,267

(22) Filed: Jul. 23, 2013

(65) Prior Publication Data

US 2015/0027723 A1    Jan. 29, 2015

(51) Int. Cl.
*E21B 34/06* (2006.01)
*E21B 41/00* (2006.01)
*G01V 11/00* (2006.01)

(52) U.S. Cl.
CPC .............. *E21B 34/066* (2013.01); *E21B 41/00* (2013.01); *G01V 11/002* (2013.01)

(58) Field of Classification Search
CPC ....... E21B 34/06; E21B 34/066; E21B 34/14
See application file for complete search history.

(56) References Cited

U.S. PATENT DOCUMENTS

| | | | |
|---|---|---|---|
| 2,189,936 A | 8/1938 | Broyles | |
| 2,189,937 A | 2/1940 | Broyles | |
| 2,308,004 A | 1/1943 | Hart | |
| 2,330,265 A | 9/1943 | Burt | |
| 2,373,006 A | 4/1945 | Baker | |
| 2,381,929 A | 8/1945 | Schlumberger | |
| 2,618,343 A | 11/1952 | Conrad | |
| 2,637,402 A | 5/1953 | Baker et al. | |
| 2,640,547 A | 6/1953 | Baker et al. | |

(Continued)

FOREIGN PATENT DOCUMENTS

| WO | 0220942 A1 | 3/2002 |
|---|---|---|
| WO | 2010079327 A1 | 7/2010 |

OTHER PUBLICATIONS

Office Action issued Feb. 21, 2014 for U.S. Appl. No. 13/219,790, 33 pages.

(Continued)

*Primary Examiner* — David Andrews
*Assistant Examiner* — Tara Schimpf
(74) *Attorney, Agent, or Firm* — Locke Lord LLP; Peter Fallon; Joshua L. Jones

(57) ABSTRACT

A method of activating a tool can include displacing a device in the tool, the device transmitting energy to a receiver of the tool, thereby activating the tool, and the transmitting including a control circuitry increasing electrical current flow between an electrical power source and a transmitter in response to a sensor detecting a predetermined stimulus downhole. A system can include a tool including a receiver and an electrical load, and a device which displaces relative to the tool, the device including a transmitter, a sensor and an electrical power source. Another method can include displacing a device in a tubular string including multiple downhole tools, each including a receiver and an electrical load, and the device including a transmitter and a sensor. The transmitter transmits energy to at least one of the receivers in response to sensor detection of a predetermined number of the tools traversed by the device.

23 Claims, 8 Drawing Sheets

(56) References Cited

U.S. PATENT DOCUMENTS

| | | |
|---|---|---|
| 2,695,064 A | 11/1954 | Ragan et al. |
| 2,961,045 A | 11/1960 | Stogner et al. |
| 2,974,727 A | 3/1961 | Goodwin |
| 3,029,873 A | 4/1962 | Hanes |
| 3,055,430 A | 9/1962 | Campbell |
| 3,122,728 A | 2/1964 | Lindberg, Jr. |
| 3,160,209 A | 12/1964 | Bonner |
| RE25,846 E | 8/1965 | Campbell |
| 3,233,674 A | 2/1966 | Leutwyler |
| 3,266,575 A | 8/1966 | Owen |
| 3,398,803 A | 8/1968 | Leutwyler et al. |
| 4,085,590 A | 4/1978 | Powell et al. |
| 4,282,931 A | 8/1981 | Golben |
| 4,352,397 A | 10/1982 | Christopher |
| 4,377,209 A | 3/1983 | Golben |
| 4,385,494 A | 5/1983 | Golben |
| 4,402,187 A | 9/1983 | Golben |
| 4,574,889 A | 3/1986 | Pringle |
| 4,579,177 A | 4/1986 | Going, III |
| 4,598,769 A | 7/1986 | Robertson |
| 4,606,416 A | 8/1986 | Knighton et al. |
| 4,884,953 A | 12/1989 | Golben |
| 5,024,270 A | 6/1991 | Bostick |
| 5,074,940 A | 12/1991 | Ochi et al. |
| 5,101,907 A | 4/1992 | Schultz et al. |
| 5,197,758 A | 3/1993 | Lund et al. |
| 5,211,224 A | 5/1993 | Bouldin |
| 5,238,070 A | 8/1993 | Schultz et al. |
| 5,249,630 A | 10/1993 | Meaders et al. |
| 5,257,663 A | 11/1993 | Pringle et al. |
| 5,316,081 A | 5/1994 | Baski et al. |
| 5,316,087 A | 5/1994 | Manke et al. |
| 5,396,951 A | 3/1995 | Ross |
| 5,452,763 A | 9/1995 | Owen |
| 5,476,018 A | 12/1995 | Nakanishi et al. |
| 5,485,884 A | 1/1996 | Hanley et al. |
| 5,531,270 A | 7/1996 | Fletcher et al. |
| 5,531,845 A | 7/1996 | Flanigan et al. |
| 5,573,307 A | 11/1996 | Wilkinson et al. |
| 5,585,726 A | 12/1996 | Chau |
| 5,666,050 A | 9/1997 | Bouldin et al. |
| 5,673,556 A | 10/1997 | Goldben et al. |
| 5,687,791 A | 11/1997 | Beck et al. |
| 5,700,974 A | 12/1997 | Taylor |
| 6,028,534 A | 2/2000 | Ciglenec et al. |
| 6,041,864 A | 3/2000 | Patel et al. |
| 6,128,904 A | 10/2000 | Rosso, Jr. et al. |
| 6,142,226 A | 11/2000 | Vick |
| 6,150,601 A | 11/2000 | Schnatzmeyer et al. |
| 6,152,232 A | 11/2000 | Webb et al. |
| 6,167,974 B1 | 1/2001 | Webb |
| 6,186,226 B1 | 2/2001 | Robertson |
| 6,305,467 B1 | 10/2001 | Connell et al. |
| 6,315,043 B1 | 11/2001 | Farrant et al. |
| 6,343,649 B1 | 2/2002 | Beck et al. |
| 6,343,658 B2 | 2/2002 | Webb |
| 6,378,611 B1 | 4/2002 | Helderle |
| 6,536,524 B1 | 3/2003 | Snider |
| 6,557,637 B1 | 5/2003 | Dore et al. |
| 6,561,479 B1 | 5/2003 | Eldridge |
| 6,568,470 B2 | 5/2003 | Goodson, Jr. et al. |
| 6,598,679 B2 | 7/2003 | Robertson |
| 6,651,747 B2 | 11/2003 | Chen et al. |
| 6,659,186 B2 | 12/2003 | Patel |
| 6,684,950 B2 | 2/2004 | Patel |
| 6,695,061 B2 | 2/2004 | Fripp et al. |
| 6,705,425 B2 | 3/2004 | West |
| 6,776,255 B2 | 8/2004 | West et al. |
| 6,925,937 B2 | 8/2005 | Robertson |
| 6,962,215 B2 | 11/2005 | Curtis et al. |
| 6,971,449 B1 | 12/2005 | Robertson |
| 6,973,993 B2 | 12/2005 | West et al. |
| 6,988,556 B2 | 1/2006 | Vick, Jr. |
| 7,083,009 B2 | 8/2006 | Paluch et al. |
| 7,152,679 B2 | 12/2006 | Simpson |
| 7,191,672 B2 | 3/2007 | Ringgenberg et al. |
| 7,197,923 B1 | 4/2007 | Wright et al. |
| 7,237,616 B2 | 7/2007 | Patel |
| 7,395,882 B2 | 7/2008 | Oldham et al. |
| 7,413,011 B1 | 8/2008 | Chee et al. |
| 7,431,335 B2 | 10/2008 | Khandhadia et al. |
| 7,597,151 B2 | 10/2009 | Curtis et al. |
| 7,604,062 B2 | 10/2009 | Murray |
| 2002/0195247 A1 | 12/2002 | Ciglenec et al. |
| 2003/0019622 A1 | 1/2003 | Goodson, Jr. et al. |
| 2003/0150622 A1 | 8/2003 | Patel et al. |
| 2003/0155131 A1 | 8/2003 | Vick, Jr. |
| 2004/0227509 A1 | 11/2004 | Ucan |
| 2005/0011645 A1 | 1/2005 | Aronstam et al. |
| 2005/0115708 A1 | 6/2005 | Jabusch |
| 2005/0189882 A1* | 9/2005 | Baarman .............. A61L 2/10 315/62 |
| 2005/0260468 A1 | 11/2005 | Fripp et al. |
| 2005/0263286 A1 | 12/2005 | Sheffield |
| 2006/0005965 A1 | 1/2006 | Chouzenoux et al. |
| 2006/0124310 A1 | 6/2006 | Lopez de Cardenas et al. |
| 2006/0144590 A1 | 7/2006 | Lopez de Cardenas et al. |
| 2007/0039508 A1 | 2/2007 | Saito et al. |
| 2007/0079989 A1 | 4/2007 | Bankston et al. |
| 2007/0089911 A1 | 4/2007 | Moyes |
| 2008/0236840 A1 | 10/2008 | Nguy |
| 2009/0159276 A1 | 6/2009 | Chouzenoux et al. |
| 2009/0223670 A1* | 9/2009 | Snider .............. E21B 23/00 166/308.1 |
| 2009/0301233 A1 | 12/2009 | Irani et al. |
| 2009/0308588 A1 | 12/2009 | Howell et al. |
| 2010/0084060 A1 | 4/2010 | Hinshaw et al. |
| 2010/0201352 A1 | 8/2010 | Englert |
| 2011/0232917 A1* | 9/2011 | Skinner .............. E21B 21/10 166/373 |
| 2011/0240301 A1 | 10/2011 | Robison et al. |
| 2011/0240311 A1 | 10/2011 | Robison et al. |
| 2011/0265987 A1 | 11/2011 | Wright et al. |
| 2011/0284240 A1 | 11/2011 | Chen et al. |
| 2012/0006562 A1 | 1/2012 | Speer et al. |
| 2012/0085538 A1* | 4/2012 | Guerrero .............. E21B 33/12 166/284 |
| 2013/0048291 A1 | 2/2013 | Merron et al. |

OTHER PUBLICATIONS

Specification and Drawings for U.S. Appl. No. 13/440,823, filed Apr. 5, 2012, 52 pages.

Office Action issued Feb. 10, 2005 for U.S. Appl. No. 10/426,917, 6 pages.

Office Action issued Mar. 1, 2007 for U.S. Appl. No. 11/180,140, 9 pages.

Office Action issued Sep. 17, 2007 for U.S. Appl. No. 11/180,140, 8 pages.

Office Action issued Feb. 26, 2009 for U.S. Appl. No. 11/180,140, 7 pages.

Office Action issued Sep. 9, 2008 for U.S. Appl. No. 11/180,140, 12 pages.

Office Action issued Oct. 27, 2008 for U.S. Appl. No. 11/180,140, 11 pages.

Office Action issued Feb. 10, 2009 for U.S. Appl. No. 10/426,917, 11 pages.

Office Action issued Jul. 11, 2013 for U.S. Appl. No. 13/219,790, 40 pages.

Specification and Drawings for U.S. Appl. No. 13/539,392, filed Nov. 8, 2009, 47 pages.

Specification and Drawings for U.S. Appl. No. 12/831,240, filed Jul. 6, 2010, 65 pages.

Specification and Drawings for U.S. Appl. No. 12/962,621, filed Dec. 10, 2010, 32 pages.

Specification and Drawings for U.S. Appl. No. 13/219,790, filed Aug. 29, 2011, 49 pages.

Specification and Drawings for U.S. Appl. No. 13/440,727, filed Apr. 5, 2012, 53 pages.

Specification and Drawings for U.S. Appl. No. 13/025,039, filed Feb. 10, 2011, 69 pages.

(56) References Cited

OTHER PUBLICATIONS

Specification and Drawings for U.S. Appl. No. 13/025,041, filed Feb. 10, 2011, 71 pages.
Specification and Drawings for U.S. Appl. No. 13/151,457, filed Jun. 2, 2011, 78 pages.
Specification and Drawings filed Jul. 23, 2013, U.S. Appl. No. 13/948,267, 38 pages.
Specification and Drawings filed Jul. 23, 2013, U.S. Appl. No. 13/948,278, 37 pages.
International Search Report and Written Opinion issued Mar. 11, 2013 for PCT Application No. PCT/US2012/050762, 14 pages.
International Search Report and Written Opinion issued May 30, 2013 for PCT Patent Application No. PCT/US2013/029750, 18 pages.
International Search Report and Written Opinion issued Jul. 23, 2013 for PCT Patent Application No. PCT/US2013/029762, 14 pages.
Search Report issued Jun. 23, 2011 for International Patent Application Serial No. PCT/US10/61047, 5 pages.
Written Opinion issued Jun. 23, 2011 for International Patent Application Serial No. PCT/US10/61047, 4 pages.
International Preliminary Report on Patentability and Written Opinion issued for International Patent Application No. PCT/US06/023947 dated Jan. 24, 2008, 6 pages.
Anonymous; "Smart Plugging Tool System for Selectively Actuating Wellbore Valves", originally published in Prior Art Database, dated Jan. 7, 2008, 5 pages.
Crabb, James, et al.; Patent Application and Drawings entitled, "Packing Element System with Profiled Surface", filed Jul. 6, 2010, U.S. Appl. No. 12/831,240, 65 pages.
Glidden, Steven C., "Solid State Spark Gap Replacement Switches", 2006, 4 pages.
Halliburton; "Horizontal Completion Systems", article H03280, received Jun. 30, 2011, 14 pages.
Halliburton; "Quick Trip Valve", article H02856R, dated Apr. 2002, 2 pages.
Halliburton; "Delta Stim Sleeve", article H04616, dated Sep. 2008, 4 pages.
Halliburton; "RapidFrac System", H08004, dated Oct. 2011, 3 pages.
Halliburton; "RapidFrac System", product presentation, dated 2011, 6 pages.
Halliburton; "Delta Stim Lite Sleeve", article H06033, dated Jun. 2010, 3 pages.
Mide, "Volture Piezoelectric Energy Harvesters", data sheet, dated Jan. 23, 2013, 24 pages.
Miller, Scott L.; Patent Application and Drawings entitled, "Gas Generator for Pressurizing Downhole Samples", filed Dec. 10, 2010, U.S. Appl. No. 12/962,621, 32 pages.
PES; "Model DV Dual Control Line Operated Drill Through Lubricator Valve", company document, dated Jul. 27, 2001, 6 pages.
Weatherford, "A Year of Milestones for Your Company", annual report, dated 2002, 7 pages.
Weatherford; "Products and Services Catalog", brochure # 01.01, dated 2002, 3 pages.
Weatherford; "Underbalanced Drilling: Undeniable Success", product article, dated Mar. 2002, 1 page.
International Search Report with Written Opinion issued Oct. 28, 2014 for PCT Patent Application No. PCT/US2014/045770, 17 pages.
Patent Examination Report No. 1 dated Mar. 19, 2016 Patent Application No. 2014293526.

\* cited by examiner

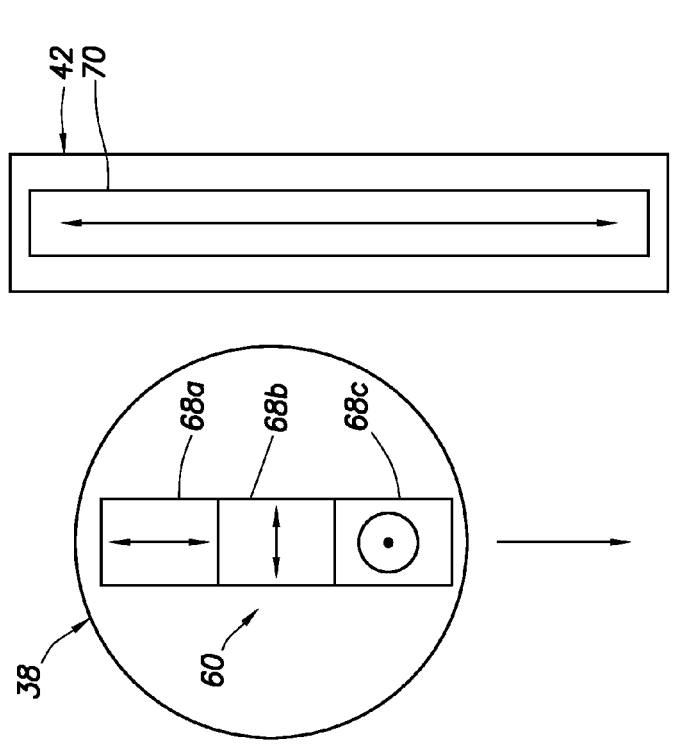
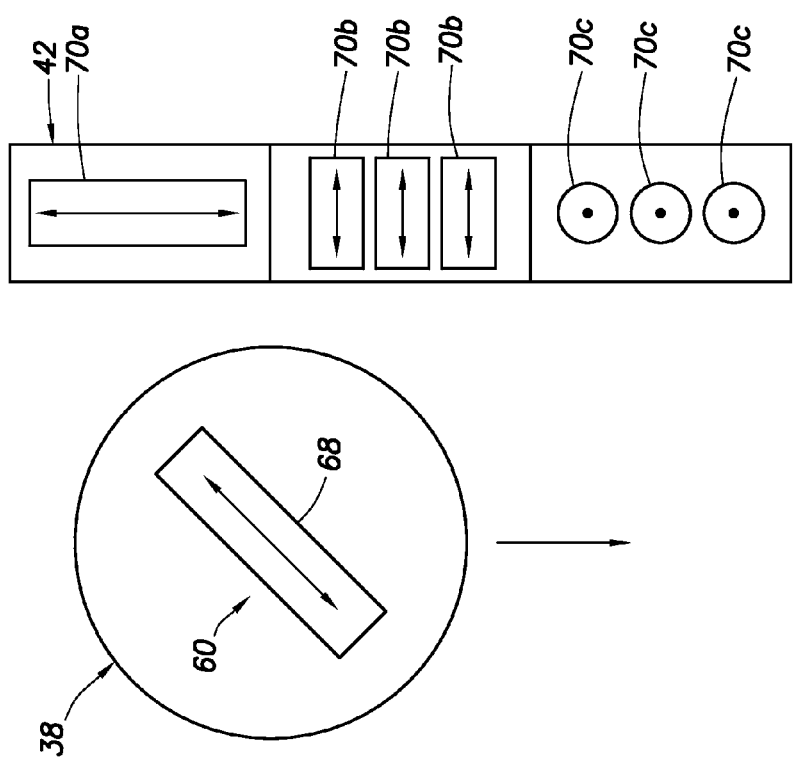

SELECTIVE ELECTRICAL ACTIVATION OF DOWNHOLE TOOLS

BACKGROUND

This disclosure relates generally to equipment utilized and operations performed in conjunction with a subterranean well and, in an example described below, more particularly provides for selective electrical actuation of downhole tools.

It is known to store electrical power downhole in batteries. The batteries may be used to operate electronic circuitry of a downhole tool. In order to conserve the electrical power while the electronic circuitry is not being actively used in operation of the tool, the electronic circuitry can be placed in "sleep" mode.

Unfortunately, the electronic circuitry continues to consume electrical power, even while in sleep mode. For example, the electronic circuitry may need to receive and process measurements made by a sensor, in order to detect when the electronic circuitry should "awaken" from the sleep mode. This electrical power consumption by the electronic circuitry in the sleep mode can significantly reduce the stored electrical power over long periods of time.

Therefore, for the above reasons and others, it will be appreciated that improvements are continually needed in the art of electrically actuating downhole tools. Such improvements can be useful whether or not batteries are used for downhole electrical power storage, and whether or not any circuitry is awaken from a sleep mode, etc.

BRIEF DESCRIPTION OF THE DRAWINGS

FIG. 6 is a representative schematic view of an electromagnetic transmitter and an electromagnetic receiver of the downhole tool.

FIG. 7 is a representative schematic view of another example of the electromagnetic transmitter and receiver.

DETAILED DESCRIPTION

Figure 1:
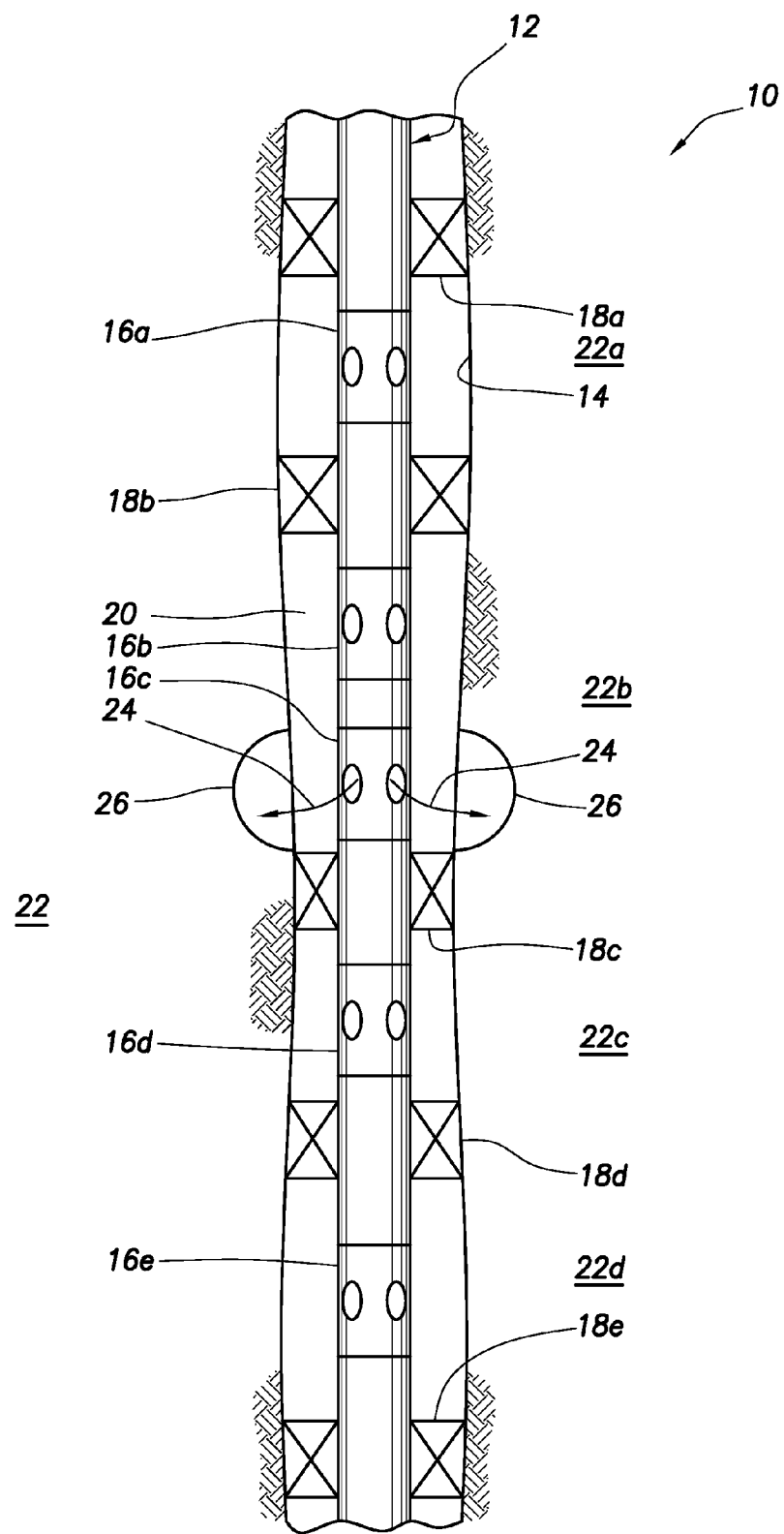
FIG. 1 is a representative partially cross-sectional view of a well system and associated method which can embody principles of this disclosure.

Representatively illustrated in FIG. 1 is a system 10 for use with a well, and an associated method, which can embody principles of this disclosure. In this example, a tubular string 12 is positioned in a wellbore 14, with the tubular string having multiple downhole tools 16a-e, 18a-e interconnected therein. In this example, the downhole tools 16a-e are injection valves, and the downhole tools 18a-e are packers, but other types of downhole tools (such as, samplers, data gathering tools, etc.) can incorporate the principles of this disclosure.

The tubular string 12 may be of the type known to those skilled in the art as casing, liner, tubing, a production string, a work string, a drill string, etc. Any type of tubular string may be used and remain within the scope of this disclosure.

The packers 18a-e seal off an annulus 20 formed radially between the tubular string 12 and the wellbore 14. The packers 18a-e in this example are designed for sealing engagement with an uncased or open hole wellbore 14, but if the wellbore is cased or lined, then cased hole-type packers may be used instead. Swellable, inflatable, expandable and other types of packers may be used, as appropriate for the well conditions, or no packers may be used (for example, the tubular string 12 could be expanded into contact with the wellbore 14, the tubular string could be cemented in the wellbore, etc.).

In the FIG. 1 example, the injection valves 16a-e permit selective fluid communication between an interior of the tubular string 12 and each section of the annulus 20 isolated between two of the packers 18a-e. Each section of the annulus 20 is in fluid communication with a corresponding earth formation zone 22a-d. Of course, if packers 18a-e are not used, then the injection valves 16a-e can otherwise be placed in communication with the individual zones 22a-d, for example, with perforations, etc.

The zones 22a-d may be sections of a same formation 22, or they may be sections of different formations. Each zone 22a-d may be associated with one or more of the injection valves 16a-e.

In the FIG. 1 example, two injection valves 16b,c are associated with the section of the annulus 20 isolated between the packers 18b,c, and this section of the annulus is in communication with the associated zone 22b. It will be appreciated that any number of injection valves may be associated with a zone.

It is sometimes beneficial to initiate fractures 26 at multiple locations in a zone (for example, in tight shale formations, etc.), in which cases the multiple injection valves can provide for injecting fluid 24 at multiple fracture initiation points along the wellbore 14. In the example depicted in FIG. 1, the valve 16c has been opened, and fluid 24 is being injected into the zone 22b, thereby forming the fractures 26.

Preferably, the other valves 16a,b,d,e are closed while the fluid 24 is being flowed out of the valve 16c and into the zone 22b. This enables all of the fluid 24 flow to be directed toward forming the fractures 26, with enhanced control over the operation at that particular location.

However, in other examples, multiple valves 16a-e could be open while the fluid 24 is flowed into a zone of an earth formation 22. In the well system 10, for example, both of the valves 16b,c could be open while the fluid 24 is flowed into the zone 22b. This would enable fractures to be formed at multiple fracture initiation locations corresponding to the open valves.

It will, thus, be appreciated that it would be beneficial to be able to open different sets of one or more of the valves 16a-e at different times. For example, one set (such as valves 16b,c) could be opened at one time (such as, when it is desired to form fractures 26 into the zone 22b), and another set (such as valve 16a) could be opened at another time (such as, when it is desired to form fractures into the zone 22a).

One or more sets of the valves 16a-e could be open simultaneously. However, it is generally preferable for only one set of the valves 16a-e to be open at a time, so that the fluid 24 flow can be concentrated on a particular zone, and so flow into that zone can be individually controlled.

At this point, it should be noted that the well system 10 and method are described here and depicted in the drawings as merely one example of a wide variety of possible systems and methods which can incorporate the principles of this disclosure. Therefore, it should be understood that those principles are not limited in any manner to the details of the system 10 or associated method, or to the details of any of the components thereof (for example, the tubular string 12, the wellbore 14, the valves 16a-e, the packers 18a-e, etc.).

It is not necessary for the wellbore 14 to be vertical as depicted in FIG. 1, for the wellbore to be uncased, for there to be five each of the valves 16a-e and packers, for there to be four of the zones 22a-d, for fractures 26 to be formed in the zones, for the fluid 24 to be injected, etc. The fluid 24 could be any type of fluid which is injected into an earth formation, e.g., for stimulation, conformance, acidizing, fracturing, water-flooding, steam-flooding, treatment, gravel packing, cementing, or any other purpose. Thus, it will be appreciated that the principles of this disclosure are applicable to many different types of well systems and operations.

In other examples, the principles of this disclosure could be applied in circumstances where fluid is not only injected, but is also (or only) produced from the formation 22. In these examples, the fluid 24 could be oil, gas, water, etc., produced from the formation 22. Thus, well tools other than injection valves can benefit from the principles described herein.

Figure 2A:
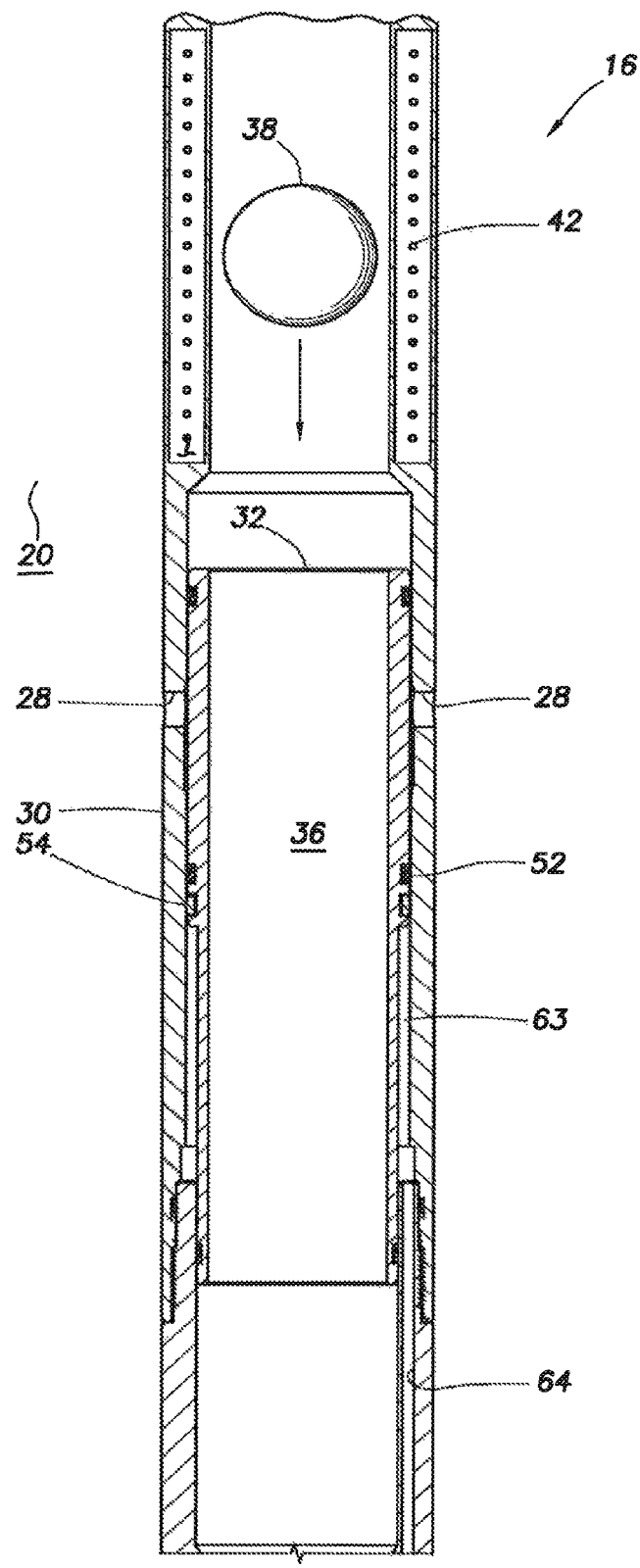
FIGS. 2A & B are representative cross-sectional views of successive axial sections of a downhole tool that may be used in the system and method of claim 1, and which can embody principles of this disclosure.
Figure 2B:
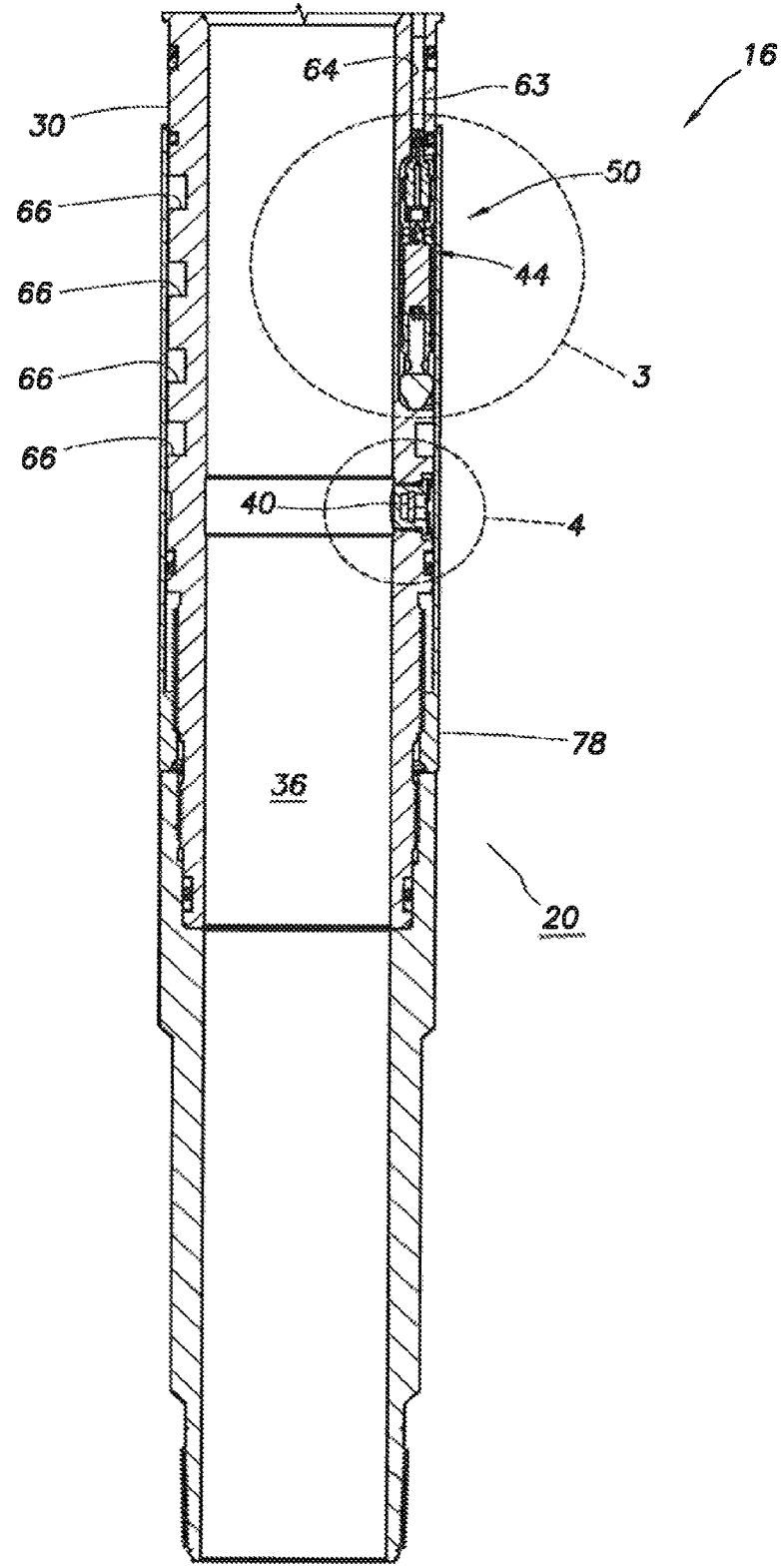
Figure 3:
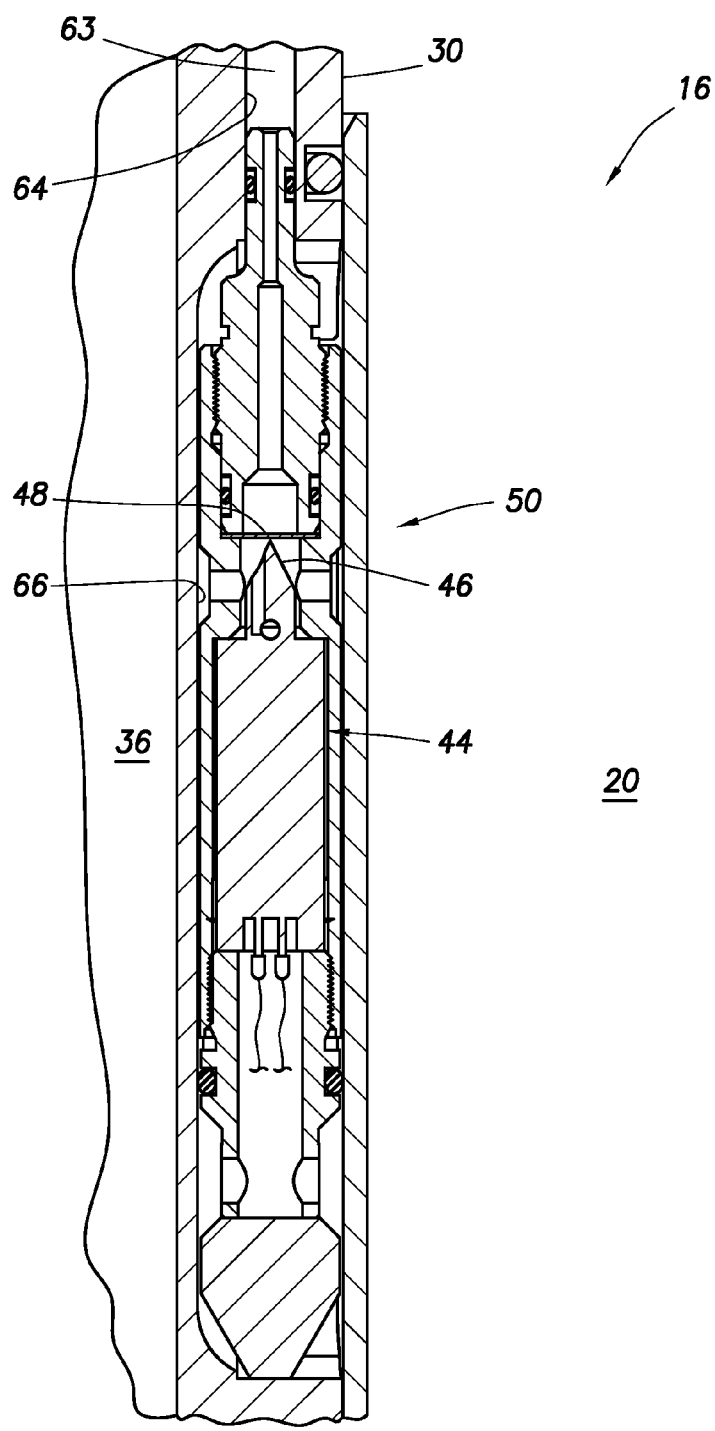
FIG. 3 is a representative cross-sectional view of an actuator of the downhole tool.
Figure 4:
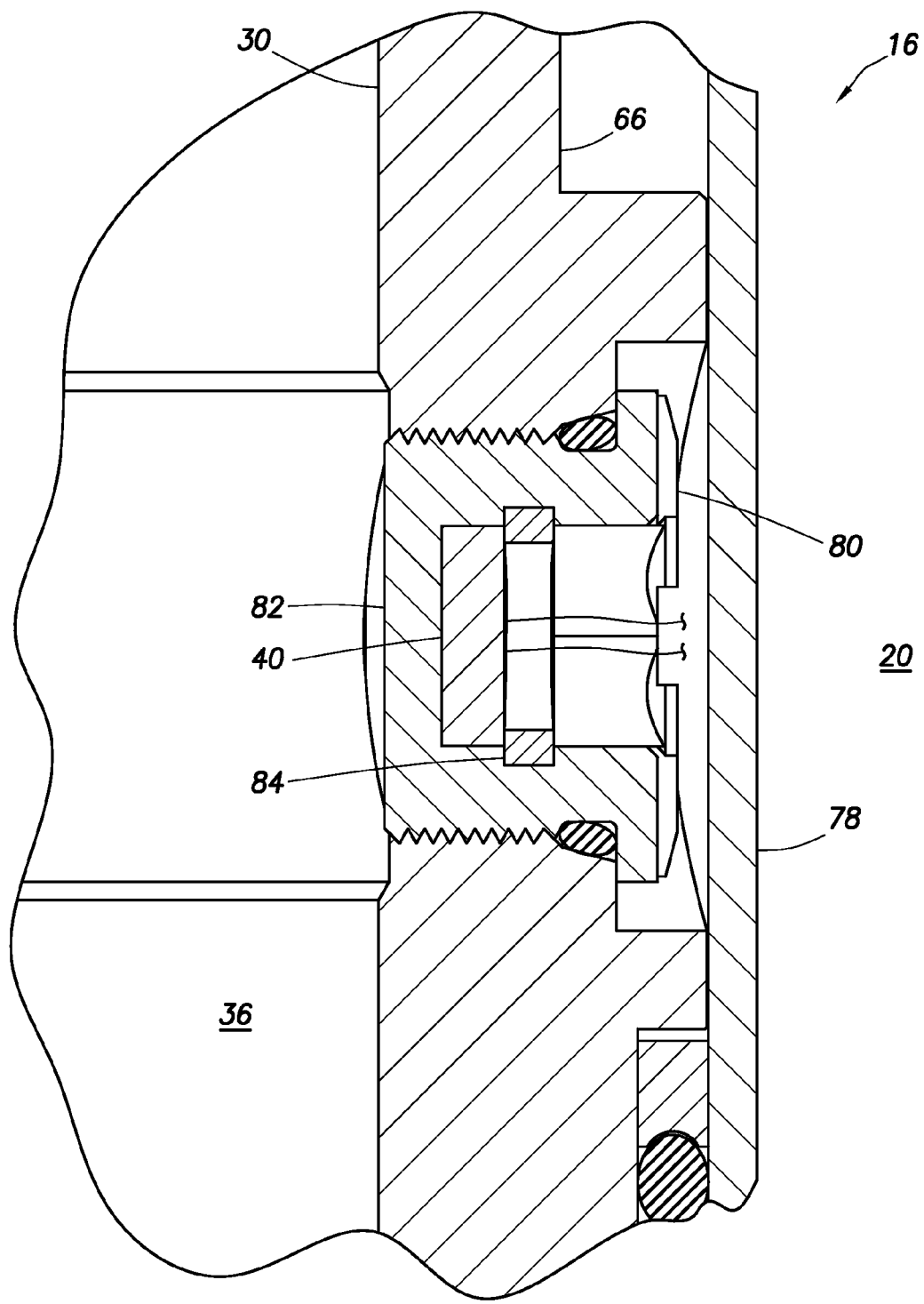
FIG. 4 is a representative cross-sectional view of a magnetic device of the downhole tool.

Referring additionally now to FIGS. 2A-4, an example of an injection valve 16 is representatively illustrated. In FIGS. 2A & B, the valve 16 is depicted in a closed configuration. FIG. 3 depicts an enlarged scale view of an actuator 50 of the valve 16. FIG. 4 depicts an enlarged scale view of an indicator 40 of the valve for producing a predetermined stimulus.

In FIGS. 2A & B, it may be seen that a support fluid 63 is contained in a chamber 64, which extends as a passage to the actuator 50. In addition, a chamber 66 comprises multiple annular recesses extending about a housing 30. A sleeve 78 isolates the chamber 66 and actuator 50 from well fluid in the annulus 20.

In FIG. 3, a manner in which a pressure barrier 48 isolates the chamber 64 from the chamber 66 can be more clearly seen. When a valve device 44 is actuated, a piercing member 46 pierces the pressure barrier 48, allowing the support fluid 63 to flow from the chamber 64 to the chamber 66 in which the valve device 44 is located.

Initially, the chamber 66 is at or near atmospheric pressure, and contains air or an inert gas. Thus, the support fluid 63 can readily flow into the chamber 66, allowing a sleeve 32 to displace downwardly, due to a pressure differential across a piston 52.

In FIG. 4, a manner in which the indicator 40 can be positioned for producing a magnetic field in a flow passage 36 extending longitudinally through the valve 16 can be clearly seen. In this example, the indicator 40 is mounted in a plug 80 secured in the housing 30 in close proximity to the passage 36.

The indicator 40 is preferably separated from the flow passage 36 by a pressure barrier 82 having a relatively low magnetic permeability. The pressure barrier 82 may be integrally formed as part of the plug 80, or the pressure barrier could be a separate element, etc.

Suitable low magnetic permeability materials for the pressure barrier 82 can include Inconel and other high nickel and chromium content alloys, stainless steels (such as, 300 series stainless steels, duplex stainless steels, etc.). Inconel alloys have magnetic permeabilities of about $1\times10^{-6}$, for example. Aluminum (magnetic permeability $\sim1.26\times10^{-6}$), plastics, composites (e.g., with carbon fiber, etc.) and other nonmagnetic materials may also be used.

One advantage of making the pressure barrier 82 out of a low magnetic permeability material is that the housing 30 can be made of a relatively low cost high magnetic permeability material (such as steel, having a magnetic permeability of about $9\times10^{-4}$, for example). Thus, magnetic flux can readily pass through the relatively low magnetic permeability pressure barrier 82 without being significantly distorted.

In some examples, a relatively high magnetic permeability material 84 may be provided proximate the indicator 40 and/or pressure barrier 82, in order to focus the magnetic flux in the passage 36. The indicator 40 may comprise a permanent magnet or another material/structure which can provide an indication of the presence of the tool 16 to a device 38 displacing in the passage 36.

The device 38 may pass through multiple tools (such as tools 16a-e in the FIG. 1 example), and the indicator 40 provides a convenient means of allowing the device to count how many of the tools have been traversed. However, the scope of this disclosure is not limited to use of the indicator 40 for generating a predetermined stimulus sensed by the device 38, or to use of any particular type of indicator.

The device 38 transmits energy to a receiver 42 of the tool 16, thereby supplying the tool with electrical power. In this manner, the tool 16 does not have to include its own electrical power source (such as batteries, etc.), which can degrade, deteriorate or discharge over time.

Instead, electrical power can be supplied to the tool 16 at any time the device 38 is proximate the tool. However, a decision as to whether or not energy is transmitted from the device 38 to the tool 16 (when the device is proximate the tool) is made in the device, as described more fully below.

In the FIGS. 2A-4 example, when sufficient energy is transmitted from the device 38 to the receiver 42, the actuator 50 is actuated, the piercing member 46 pierces the pressure barrier 48, thereby allowing the support fluid 63 to flow into the chamber 66, and the sleeve 32 is allowed to displace downward due to a pressure differential across the piston 52. When the sleeve displaces downward, openings 28 in the housing are unblocked, thereby permitting fluid flow between the annulus 20 and the passage 36.

A locking device 54 (for example, a snap ring) can be used to prevent subsequent upward displacement of the sleeve 32. In other examples, it may be desired to close the valve 16 after it has been opened. In those examples, the locking device 54 may not be used, or it may be releasable.

Note that the valve 16 is depicted in the drawings and described herein as merely one example of a downhole tool that can embody principles of this disclosure. Other examples of valves that can embody the principles of this disclosure are described in U.S. patent application Ser. No. 13/440,823. Packers 18a-e and other types of downhole tools can embody this disclosure's principles. Therefore, the scope of this disclosure is not limited to the details of the valve 16, or to any particular type of downhole tool.

Figure 5:
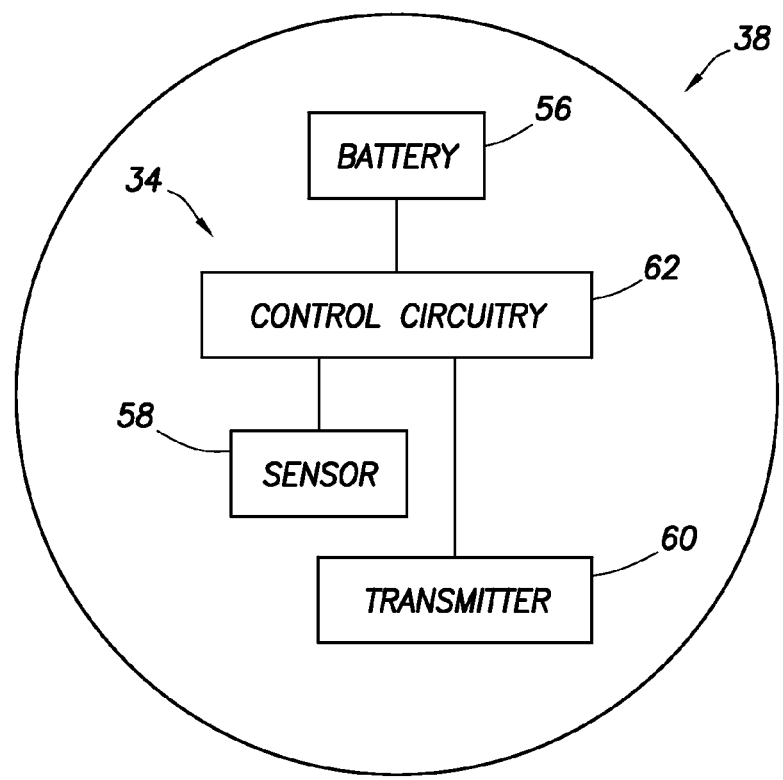
FIG. 5 is a representative schematic view of a device that can be used to activate the downhole tool, and which can embody principles of this disclosure.

Referring additionally now to FIG. 5, a schematic view of one example of the device 38 is representatively illustrated. In this example, the device 38 is in the shape of a ball or sphere, and includes therein a control system 34. In other examples, the device 38 could have other shapes, such as a rod, a dart, a ball with a tail, etc.

The control system 34 in this example includes an electrical power source 56 (such as, a battery, a charged capacitor, a generator, etc.), a sensor 58 (such as, a magnetic field sensor, an accelerometer, a pressure sensor, an antenna, etc.), a transmitter 60 and control circuitry 62. More, different or fewer elements can be included in other examples of the device 38, and so it should be clearly understood that the scope of this disclosure is not limited to the details of the device as described herein or depicted in the drawings.

The sensor 58 is used to detect the predetermined stimulus produced by the indicator 40 of the tool 16. For example, the sensor 58 can be a magnetic field sensor which detects a magnetic field produced by the indicator 40. Alternatively, or in addition, the sensor 58 can detect other stimulus in a downhole environment (such as, pressure and/or temperature, etc.). The scope of this disclosure is not limited to use of any particular type of sensor(s).

The control circuitry 62 is used to determine whether the transmitter 60 should be supplied with electrical power from the power source 56 to transmit energy to the receiver 42 of the tool 16. For example, the circuitry 62 may cause the transmitter 60 to transmit energy only when the sensor 58 detects that a predetermined number of downhole tools 16 have been traversed by the device 38, only when the sensor detects that a threshold pressure or temperature has been reached, etc.

In this manner, electrical power stored by the power source 56 can be conserved until it is used to activate a tool 16 and/or the transmitter 60 can transmit energy to activate only a desired one or more of multiple tools (e.g., by transmitting energy only when the device 38 is proximate the tool(s) which it is desired to activate). For making such decisions and causing the transmitter 60 to transmit energy at appropriate time(s), the circuitry 62 can include one or more processors, memory (volatile and/or non-volatile, programmable, etc.), signal conditioners, switches, etc. The scope of this disclosure is not limited to use of any particular type or configuration of control circuitry.

The transmitter 60 can be any type of transmitter that can transmit energy to the receiver 42. In the FIGS. 2A & B example, the receiver 42 is in the form of a conductive coil or antenna that can receive electromagnetic energy from the transmitter (e.g., via inductive coupling), in which case the transmitter 60 can also be in the form of a conductive coil or antenna capable of transmitting electromagnetic energy.

In other examples, the transmitter 60 can be in the form of a vibrator (for transmitting kinetic energy), a heat source (such as, thermite for transmitting thermal energy), etc. The receiver 42 could be in the form of a power "harvester" (such as, an energy harvester, one suitable example of which is a VOLTURE™ energy harvester marketed by Mide Technology of Medford, Mass. USA) if the transmitter 60 transmits kinetic energy, a thermoelectric generator if the transmitter transmits thermal energy, etc. The scope of this disclosure is not limited to use of any particular type of transmitter or receiver.

Referring additionally now to FIG. 6, the device 38 and receiver 42 are representatively illustrated, apart from the remainder of the system 10. In this example, the device 38 includes the transmitter 60 in the form of an antenna 68 that is randomly oriented (that is, the antenna can change orientation as the device 38 displaces through the tubular string 12).

In order to ensure that the receiver 42 can reliably receive electromagnetic energy from the transmitter 60, no matter the orientation of the antenna 68, the receiver in this example includes multiple differently oriented antennae 70a-c. The receiver 42 can include any number of antennae 70a-c in each orientation.

The antennae 70a-c are oriented in three orthogonal directions as depicted in FIG. 6, but other directions or numbers of directions may be used in other examples. Thus, the scope of this disclosure is not limited to any particular direction(s) of antennae in the device 38 or receiver 42.

In FIG. 7, another example of the device 38 and receiver 42 are representatively illustrated. In this example, the transmitter 60 is still randomly oriented, but it includes multiple antennae 68a-c, so that an antenna 70 of the receiver 42 will reliably receive electromagnetic energy from one or more of the device antennae, no matter the orientation of the device.

It may be desirable in this example for the antennae 68a-e to transmit slightly off-frequency from each other, in order to produce a beating effect, for enhanced energy transfer to the receiver antenna 70. The antennae 68a-c are oriented in three orthogonal directions as depicted in FIG. 7, but other directions or numbers of directions may be used in other examples.

It may be desirable to prevent random orientation of the device 38. For example, the device 38 could be oblong, dart- or rod-shaped, provided with a tail, provided with an internal gimbal mechanism, etc. Any manner of providing for a fixed orientation of the device 38 relative to the receiver 42 may be used, in keeping with the scope of this disclosure.

Figure 8:
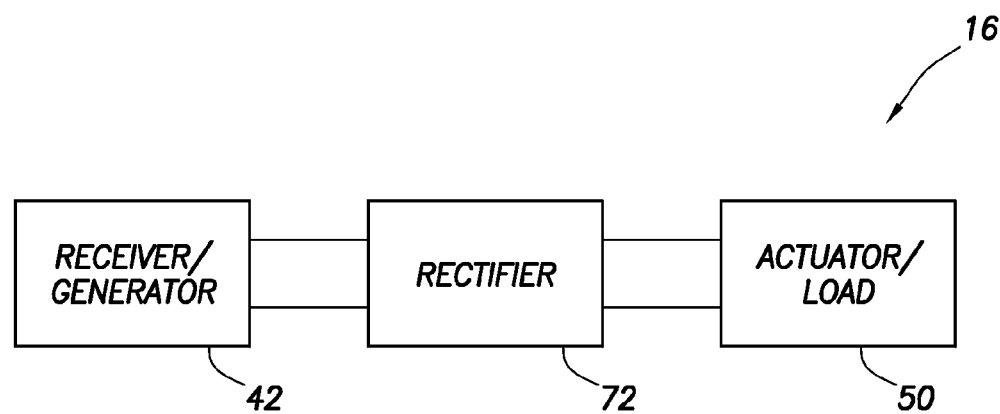
FIG. 8 is a representative electrical block diagram for the downhole tool.

Referring additionally now to FIG. 8, a representative electrical block diagram for the downhole tool 16 is illustrated. In this diagram it may be seen that the receiver 42 is electrically connected, via a rectifier 72, to the actuator 50.

If the receiver 42 receives time varying electromagnetic energy (e.g., via inductive coupling) from the transmitter 60, the rectifier 72 can convert a resulting alternating current to direct current for actuation of the actuator 50. In some examples, the actuator 50 can be actuated in response to alternating current, and so the rectifier 72 may not be used. In other examples, the receiver 42 may produce direct current in response to the energy transmitted from the transmitter 60, in which case the rectifier 72 may not be used.

If the receiver 42 comprises an electrical generator (such as, a thermoelectric generator, a piezoelectric energy harvester, etc.), the rectifier 72 may or may not be used, depending on whether the generator produces alternating current, and whether the actuator 50 can be actuated in response to alternating current. Thus, use of the rectifier 72 is not necessary.

The downhole tool 16 can also include a control system for controlling when the actuator 50 is to be actuated. The control system (not shown) could be supplied with electrical power via the device 38, and could permit the electrical power to be supplied to the actuator 50 for actuation of the tool 16 when certain condition(s)/stimulus is/are present.

For this purpose, the tool 16 could also include one or more sensors (not shown) for detecting the condition(s)/stimulus. Thus, it is not necessary for the actuator 50 to actuate the tool 16 immediately upon transfer of energy from the transmitter 60 to the receiver 42.

It is not necessary for the actuator 50 to cause an overt physical actuation of the downhole tool 16. Instead, activation of the tool 16 in response to the transfer of energy from the transmitter 60 to the receiver 42 could be in the form of, for example, initiation of data recording (e.g., as in during a formation test, a completion or conformance evaluation, etc.). Thus, activation of the downhole tool 16 can comprise supplying electrical current to any type of electrical load, in keeping with the scope of this disclosure.

It is not necessary for the device 38 to transmit energy only when it is desired to activate a particular one or more downhole tools 16. For example, while the device 38 is being displaced through the tubular string 12, one or more antennae of the transmitter 60 could transmit an (perhaps reduced level) electromagnetic signal, in order to detect different magnetic permittivity or permeability materials of the downhole tools (e.g., different from the remainder of the tubular string 12, such as the material 84 depicted in FIG. 4), so that the control circuitry 62 can count the number of downhole tools 16 traversed. In this example, the transmitter 60 can be used in place of, or in addition to, the sensor 58.

When an appropriate number of tool(s) 16 have been traversed, the control circuitry 62 can cause the transmitter 60 to transmit an appropriate (perhaps increased level) electromagnetic signal, in order to transfer sufficient energy to the receiver 42 for activation of the desired tool 16. Thus, the control circuitry 62 can increase electrical current supplied to the transmitter 60 when desired, whether or not the transmitter was previously supplied with electrical power.

Figure 9:
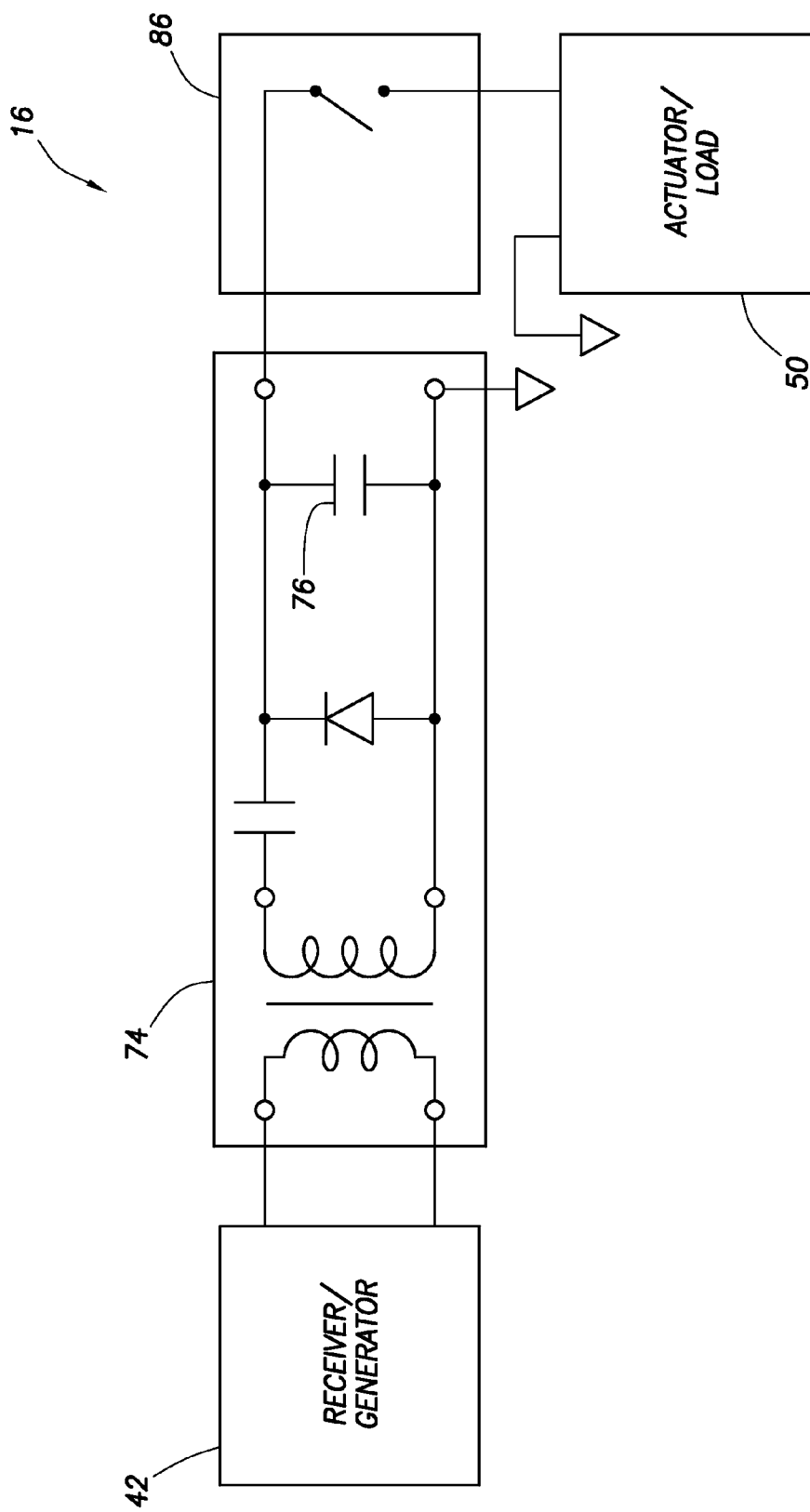
FIG. 9 is a representative example of another electrical block diagram for the downhole tool.

Referring additionally now to FIG. 9, another electrical block diagram example for the downhole tool 16 is representatively illustrated. In this example, a voltage increaser 74 is used to increase a voltage produced by the receiver 42. The voltage increaser 74 depicted in FIG. 9 is a voltage doubler, but any type of voltage increaser (e.g., a voltage quadrupler, etc.) may be used.

A capacitor 76 of the voltage increaser 74 (or another electrical power storage device) can be used to store electrical power for usage by the downhole tool 16. For example, multiple devices 38 could be displaced in the tool 16, with electrical power produced by energy transferred to the receiver 42 by each of the devices being accumulated using the capacitor 76.

As another example, a single device 38 could be displaced through multiple receivers 42 of a downhole tool 16, with electrical power produced by energy transferred by the device to each of the receivers being accumulated using the capacitor 76. As yet another example, the device 38 could remain proximate the tool 16 and transmit energy to the receiver 42 for an extended period of time, during which electrical power is accumulated using the capacitor 76.

A switch 86 can be used to deliver the electrical power to the actuator (or other electrical load) 50 when desired. For example, the switch 86 could comprise a gas discharge tube arrestor or a switching spark gap which remains open until a threshold voltage is reached across the capacitor 76, at which point the electrical power stored in the capacitor is delivered to the actuator 50. Similar results can be obtained by using a surge arrestor, a breakdown voltage of a Zener diode or a transient voltage suppression diode. Any switching technique or device may be used, in keeping with the principles of this disclosure.

It may now be fully appreciated that the above disclosure provides significant advancements to the art of selectively providing electrical power to downhole tools. In examples described above, downhole tools 16*a-e*, 18*a-e* do not have to include on-board electrical power supplies, but can be selectively provided with electrical power in response to energy transmitted from the device 38 displaced through the tubular string 12.

In particular, a method of activating a downhole tool 16 in a subterranean well is provided to the art by the above disclosure. In one example, the method comprises: displacing a device 38 in the downhole tool 16, the device 38 transmitting energy to a receiver 42 of the downhole tool 16, thereby activating the downhole tool 16; and the transmitting step including a control circuitry 62 of the device 38 increasing electrical current flow between an electrical power source 56 of the device 38 and a transmitter 60 of the device 38 in response to a sensor 58 of the device 38 detecting a predetermined stimulus downhole.

The power source 56 is preferably independent of any electrical source external to the device 38. Thus, the device 38 can include its own on-board electrical power source 56 which is not dependent on electrical power delivered from a remote location (such as, the earth's surface, a subsea location, etc.), and does not need to be tethered (e.g., via wireline, coiled tubing, etc.) to the remote location.

The predetermined stimulus may comprise a predetermined number of other downhole tools 16 (or any of tools 16*a-e* in the system 10 of FIG. 1) traversed by the device 38. Each of the other downhole tools 16 preferably includes a respective receiver 42 which can receive energy from the device transmitter 60.

The transmitter 60 may transmit at least one of electromagnetic energy, kinetic energy and thermal energy. The transmitter 60 may transmit energy to the receiver 42 only after the sensor 58 detects the predetermined stimulus downhole. The sensor 58 may comprise at least one of a magnetic field sensor, an accelerometer, a pressure sensor and an antenna.

The activating step can include causing an actuator 50 to actuate the downhole tool 16. In some examples, the activating step can include supplying electrical power to any type of electrical load of the downhole tool 16.

The receiver 42 can include multiple differently oriented antennae 70*a-c*. The transmitter 60 can include multiple differently oriented antennae 68*a-c*.

Also described above is a system 10 for use with a subterranean well. In one example, the system 10 can include at least one downhole tool 16 including a receiver 42 and an electrical load (such as the actuator 50); and a device 38 which displaces relative to the downhole tool 16. The device 38 includes a transmitter 60, a sensor 58, and an electrical power source 56 independent of any power source external to the device 38.

In some examples, the sensor 58 and transmitter 60 can be a same element (such as, if the transmitter 60 includes an antenna 68 used to transmit electromagnetic energy for detection of magnetic permeability and/or permittivity variations). The transmitter 60 transmits energy to the receiver 42 in response to detection by the sensor 58 of a predetermined stimulus in the well.

The system 10 can comprise multiple downhole tools 16*a-e*, and the predetermined stimulus can comprise a predetermined number of the downhole tools 16*a-e* traversed by the device 38.

The device 38 can include control circuitry 62 which controls whether the transmitter 60 transmits the energy to the receiver 42.

The electrical load may include an actuator 50 which actuates the downhole tool 16.

Another method of activating a selected one or more downhole tool(s) 16*a-e* in a subterranean well includes the steps of: displacing a device 38 in a tubular string 12 including the downhole tools 16*a-e*, each downhole tool 16 including a receiver 42 and an electrical load (such as the actuator 50, a data recording device, etc.), and the device 38 including a transmitter 60 and a sensor 58; and the transmitter 60 transmitting energy to a selected one or more receiver(s) 42 in response to detection by the sensor 58 of a predetermined number of the downhole tools 16*a-e* traversed by the device 38.

The electrical load may comprise an actuator 50, and the one or more downhole tool(s) 16*a-e* may be actuated in response to the one or more receiver(s) 42 receiving the energy from the transmitter 60. The device 38 can include control circuitry 62 which controls whether the transmitter 60 transmits the energy to the one or more receiver(s) 42, and which is displaced in the tubular string 12 as part of the device 38.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of activating a downhole tool in a subterranean well, the method comprising:

displacing a device in the downhole tool, the device transmitting energy to a receiver of the downhole tool, thereby activating the downhole tool; and wherein transmitting includes a control circuitry of the device increasing electrical current flow between an electrical power source of the device and a transmitter of the device in response to a sensor of the device detecting a predetermined stimulus downhole, wherein the sensor includes a magnetic field sensor and wherein the predetermined stimulus includes a magnetic field produced by an indicator mounted in a plug that includes a pressure barrier having a lower magnetic permeability than a housing of the downhole tool into which the plug is secured.

2. The method of claim 1, wherein the power source is independent of any electrical source external to the device.

3. The method of claim 1, wherein the predetermined stimulus comprises a predetermined number of other downhole tools traversed by the device.

4. The method of claim 3, wherein each of the other downhole tools includes a respective receiver which can receive energy from the device transmitter.

5. The method of claim 1, wherein the transmitter transmits at least one of the group consisting of electromagnetic energy, kinetic energy, and thermal energy.

6. The method of claim 1, wherein the transmitter transmits energy to the receiver only after the sensor detects the predetermined stimulus downhole.

7. The method of claim 1, wherein the activating comprises causing an actuator to actuate the downhole tool.

8. The method of claim 1, wherein the receiver comprises multiple differently oriented antennae.

9. The method of claim 1, wherein the transmitter comprises multiple differently oriented antennae.

10. A system for use with a subterranean well, the system comprising:

at least one downhole tool including a receiver and an electrical load; and a device which displaces relative to the downhole tool, the device including a transmitter, a sensor, and an electrical power source independent of any power source external to the device, wherein the transmitter transmits energy to the receiver in response to detection by the sensor of a predetermined stimulus in the well, wherein the sensor includes a magnetic field sensor and wherein the predetermined stimulus includes a magnetic field produced by an indicator mounted in a plug that includes a pressure barrier having a lower magnetic permeability than a housing of the downhole tool into which the plug is secured.

11. The system of claim 10, wherein the at least one downhole tool comprises multiple downhole tools, and wherein the predetermined stimulus comprises a predetermined number of the downhole tools traversed by the device.

12. The system of claim 11, wherein each of the downhole tools includes a respective one of the receiver which can receive energy from the device transmitter.

13. The system of claim 10, wherein the transmitter transmits at least one of the group consisting of electromagnetic energy, kinetic energy, and thermal energy.

14. The system of claim 10, wherein the device further comprises control circuitry which controls whether the transmitter transmits the energy to the receiver.

15. The system of claim 10, wherein the electrical load comprises an actuator which actuates the downhole tool.

16. The system of claim 10, wherein the receiver comprises multiple differently oriented antennae.

17. The system of claim 10, wherein the transmitter comprises multiple differently oriented antennae.

18. A method of activating at least one of multiple downhole tools in a subterranean well, the method comprising:

displacing a device in a tubular string including the downhole tools, each downhole tool including a receiver and an electrical load, and the device including a transmitter and a sensor; and the transmitter transmitting energy to at least one of the receivers in response to detection by the sensor of a predetermined number of the downhole tools traversed by the device, wherein the sensor includes a magnetic field sensor and wherein each of the downhole tools includes an indicator producing a magnetic field, wherein the indicator is mounted in a plug that includes a pressure barrier having a lower magnetic permeability than a housing of the downhole tool into which the plug is secured.

19. The method of claim 18, wherein the electrical load comprises an actuator, and wherein the at least one of the downhole tools is actuated in response to the at least one of the receivers receiving the energy from the transmitter.

20. The method of claim 18, wherein the transmitter transmits at least one of the group consisting of electromagnetic energy, kinetic energy, and thermal energy.

21. The method of claim 18, wherein the device further comprises control circuitry which controls whether the transmitter transmits the energy to the at least one of the receivers, and which is displaced in the tubular string as part of the device.

22. The method of claim 18, wherein each receiver comprises multiple differently oriented antennae.

23. The method of claim 18, wherein the transmitter comprises multiple differently oriented antennae.

* * * * *